Jan. 13, 1959 M. J. PIFER 2,869,040

SOLDER-DIPPED STAMPED WIRING

Filed Jan. 11, 1954

INVENTOR
MARION J. PIFER

BY
Michael Hertz
ATTORNEY

United States Patent Office 2,869,040
Patented Jan. 13, 1959

2,869,040

SOLDER-DIPPED STAMPED WIRING

Marion J. Pifer, Williamsville, N. Y., assignor to Sylvania Electric Products Inc., a corporation of Massachusetts Application January 11, 1954, Serial No. 403,378

4 Claims. (Cl. 317—101)

The invention relates to means and methods for obtaining electrical connections between circuit elements. In particular it relates to the facile joining of permanent and removable components with conductors on a dielectric material, particularly where the conductors are stamped on the dielectric material or otherwise integrated therewith in accordance with modern processes.

In the prior art where printed, stamped out, electrodeposited or equivalent circuitry has been employed, it had been found necessary to utilize metallic sleeves, thimbles, tube sockets, or the like, at points along the circuit where it was desired to permanently connect into the circuit conventional wire or to removably couple into the circuit plug-in-units. With my invention such intermediate means is unnecessary, the wiring or removable units directly engaging the conductors on the dielectric.

Figure 1:
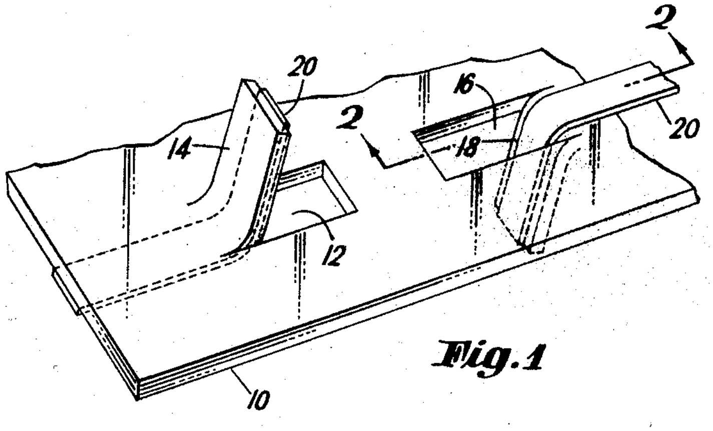

The invention also relates to means to make it possible to simultaneously solder-dip all of the connections to be made permanent and without affecting those points of the circuit on the dielectric material at which removable plug-in units are to be placed. The above and other objects of the invention will be more appreciated after reading the following specification and claims in conjunction with the accompanying drawings in which:

Fig. 1 is a perspective view showing in diagrammatic form a portion of a chassis embodying an elementary form of my invention.

Figure 2:
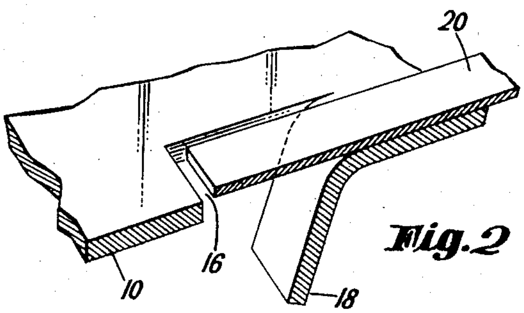
Figure 3:
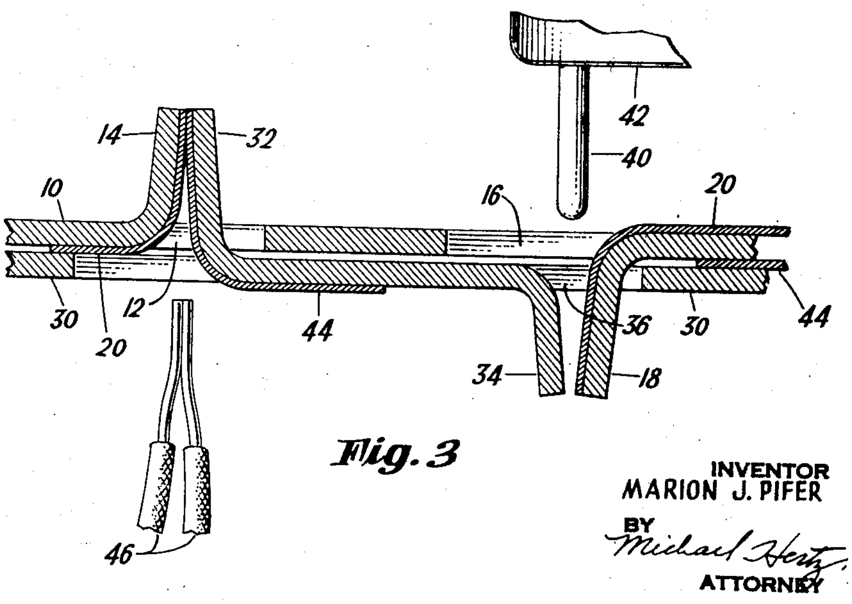

Fig. 2 is a perspective sectional view on the line 2—2 of Fig. 1, showing how a stamped out conductor may be applied to the dielectric material, the conductor being shown in its applied position on the dielectric but prior to the application of a component of the chassis, and Fig. 3 is a sectional view showing a further development of my invention wherein two complementary chassis portions are coupled together to afford means whereby different types of devices may be secured to the combined chassis.

Referring to the drawings more in detail, there is illustrated in Fig. 1 a portion of a chassis 10 which may be molded of any dielectric material.

In molding the chassis, the same is formed with openings 12 and upstanding tabs or tongues 14 which are slightly inclined from the perpendicular to the chassis surface, thus forming an acute angle therewith and the tongues being directed to the opposite walls of the openings. The chassis may also be provided with additional openings 16 and associated downwardly directed similarly inclined tabs or tongues 18. On the faces of the tongues which are presented to the openings there are applied conductors 20, the conductors being continuations of the wiring stamped out on or otherwise associated with the chassis.

If the conductors be applied to the chassis by a stamping die having a flat surface and not configurated to enter the openings 12, 16, the conductor may be applied to the dielectric as indicated in Fig. 2 with an end of the conductor overhanging an opening. As will be explained later, upon application to the chassis of a unit to be permanently or removably therewith, the conductor will be pressed against the tongue. If a number of tongues 18 and associated conductors be arranged in a formation and spacing corresponding to the fixedly spaced prongs of a plug-in unit, the prongs of the plug-in unit will be frictionally engaged by the ends of the conductors and the tongues so as to make good electrical contact with the prongs and so as to hold the unit securely in place. This holding effect can be enhanced by making the tongues of such a length that the prongs of the unit would just barely protrude therebelow.

If desired, as seen in Fig. 3, two chasses 10 and 30 may be juxtaposed with tongues of one projecting through openings in the other and with a tongue of one chassis paired with a tongue of the other, both tongues of a pair being associated with an opening. Thus upwardly directed tongue 14 on chassis 10 may be paired with upwardly directed tongue 32 on chassis 30, both extending through hole 12 in chassis 10. Or downwardly directed tongue 18 of chassis 10 may be paired with a downwardly directed tongue 34 of chassis 30, both extending through hole 36 in chassis 30. Where only one conductor is associated with a component, as conductor 20 with the prong 40 of component 42, only one of the tongues need have a conductor thereon. Where a conductor of one chassis, as conductor 20 of chassis 10, intended to be coupled to a conductor, as 44, of the other chassis 30, then both tongues would have conductors thereon. The conductor portions of the tongues may, prior to assembly of the chassis, be poked into position by a suitable tool. If desired, wires, such as 46, may be joined to the conductors on one or both of the chasses by forcing the wires in between the opposed inclined tongues. Even though the dielectric may be a molded material, it still has sufficient resiliency to allow for insertion and gripping of the aforesaid prongs or wires.

It is desirable to design a compound chassis such as is disclosed in Fig. 3 so that all of the tongues extending from one face of the chassis receive devices to be permanently soldered to the conductors, while all of the tongues extending from the opposite face receive removable units. If that be done, it is apparent that after all of the wires 46 and other devices intended to be permanently joined to the conductors on the dielectric have been forced into position between the like directed tongues, the combined chassis may be solder-dipped to solder the conductors to each other and to the devices. The immersion of the chassis in the solder, of course, is to a depth just sufficient to immerse the tongues to effect soldering of the desired joints but not to a depth to reach the main body of the chassis. Therefore the oppositely extending tongues are unaffected by the solder dipping operation and remain free of solder so that units such as 42 may be freely plugged in or removed from the chassis.

While I have exemplified the invention as applied to chassis with molded bases, obviously the bases may be made otherwise and made of material having any desired degree of springiness in the tongues. Conceivably the tongues need not be preshaped but may be flat, originally, lying in the planes of the bases and be bent out of the openings upon positioning of the units or components to be joined to the conductors on the chassis.

What is claimed as new is:

1. A chassis assembly comprising a number of juxtaposed bases each with at least one opening therein and a tongue extending from a wall of said opening toward the other wall and inclined with respect to the plane of the base with the opening in one base in communication with the opening in another base, the tongue of one base extending through an opening in another base, with the tongues associated with the communicating openings inclined toward each other and with their free ends approaching each other, and a conductor supported by its associated base and at least on one of the tongues, with the conductor on that face of the tongue which is directed toward the other tongue.

2. A chassis assembly comprising a number of juxtaposed bases each with an opening therein and a tongue extending from a wall of each opening toward an opposite wall thereof and at an angle less than a right angle with respect to the plane of the base, at least one of said bases having tongues extending in opposite directions with respect to said plane, each tongue of one base projecting through an opening in another base with the tongues inclined toward each other and their free ends approaching each other, said tongues forming a pair for reception of a unit, and conductors on said bases with the conductors extending over at least one of each pair of tongues.

3. A chassis assembly comprising a number of juxtaposed bases each with an opening therein and a tongue extending from a wall of each opening toward an opposite wall thereof and at an angle less than a right angle with respect to the plane of the base, at least one of said bases having tongues extending in opposite directions with respect to said plane, each tongue of one base projecting through an opening in another base with the tongues inclined toward each other and their free ends approaching each other, said tongues forming a pair for reception of a unit, conductors on said bases with the conductors extending over at least one of each pair of tongues, devices on one face of said assembly all permanently electrically joined to conductor portions on tongues of the assembly and removable plug-in devices on an opposite face of said assembly all in electric contact with conductor portions on other tongues of the assembly.

4. The method of asesmbling an electronic device which comprises preparing a number of bases each with an opening therein and a tongue extending from a wall of each opening toward an opposite wall thereof and at an angle less than a right angle with respect to the plane of the base, and at least one base having tongues extending in opposite direction to the first tongue with respect to the plane of the base, superimposing the bases so that tongues on one base project through openings in the other base with the resulting pair of tongues of the two bases inclined toward each other and with the free ends approaching each other, each base being additionally prepared with conductors extending over at least one of the tongues of a pair.

References Cited in the file of this patent

UNITED STATES PATENTS

| | | |
|---|---|---|
| 1,837,962 | Hensgen | Dec. 22, 1931 |
| 2,066,876 | Carpenter | Jan. 5, 1937 |
| 2,206,325 | Lomax | July 2, 1940 |
| 2,433,384 | McLarn | Dec. 30, 1947 |
| 2,502,291 | Taylor | Mar. 28, 1950 |
| 2,587,568 | Eisler | Feb. 26, 1952 |